United States Patent
Lu et al.

(10) Patent No.: US 12,425,223 B2
(45) Date of Patent: Sep. 23, 2025

(54) DATA TRANSMISSION METHOD AND DATA TRANSMISSION DEVICE

(71) Applicant: FEITIAN TECHNOLOGIES CO., LTD., Beijing (CN)

(72) Inventors: Zhou Lu, Beijing (CN); Huazhang Yu, Beijing (CN)

(73) Assignee: FEITIAN TECHNOLOGIES CO., LTD., Beijing (CN)

( * ) Notice: Subject to any disclaimer, the term of this patent is extended or adjusted under 35 U.S.C. 154(b) by 0 days.

(21) Appl. No.: 17/785,978

(22) PCT Filed: Sep. 2, 2021

(86) PCT No.: PCT/CN2021/116235
§ 371 (c)(1),
(2) Date: Jun. 16, 2022

(87) PCT Pub. No.: WO2022/052859
PCT Pub. Date: Mar. 17, 2022

(65) Prior Publication Data
US 2023/0336354 A1    Oct. 19, 2023

(30) Foreign Application Priority Data
Sep. 14, 2020   (CN) .......................... 202010957981.4

(51) Int. Cl.
*H04L 9/32* (2006.01)
*H04L 9/30* (2006.01)

(52) U.S. Cl.
CPC .............. *H04L 9/3236* (2013.01); *H04L 9/30* (2013.01)

(58) Field of Classification Search
None
See application file for complete search history.

(56) References Cited

U.S. PATENT DOCUMENTS

| | | | |
|---|---|---|---|
| 9,537,657 B1 * | 1/2017 | Char | H04L 9/0637 |
| 11,223,482 B2 * | 1/2022 | Kroneisen | H04L 9/3242 |
| 2008/0222414 A1 * | 9/2008 | Wang | H04L 9/03 713/161 |
| 2018/0035328 A1 | 2/2018 | Chen | |

FOREIGN PATENT DOCUMENTS

CN    108632020 A  * 10/2018 ......... H04L 63/0428

* cited by examiner

*Primary Examiner* — Philip J Chea
*Assistant Examiner* — Bin Qing Zheng
(74) *Attorney, Agent, or Firm* — J. Clinton Wimbish; Maynard Nexsen PC (57) ABSTRACT

A data transmission method, comprising: when a device receives first data sent by an upper computer, parsing the first data to acquire a first content hash value, a first hash value and a first length; performing signature verification on the first data according to a stored first public key; when the signature verification is successful, waiting to receive a data block sent by the upper computer; when the data block is received, verifying the data block according to the first hash value and the first length; and when the verification for the data block is successful, parsing the current data block to obtain the length and the hash value of a next data block and payload data of the current data block, and decrypting the payload data to obtain a payload data plaintext. According to the technical solution of the present invention, the process of data transmission is more secure and efficient.

5 Claims, 3 Drawing Sheets

DATA TRANSMISSION METHOD AND DATA TRANSMISSION DEVICE

FIELD OF THE INVENTION

The present invention relates to a method for making data transmission and a device therefor, which relates to the field of information security.

PRIOR ART

In prior art, data which is transmitted maybe tampered or intercepted when it is transmitted from an upper computer to a device, thus the security of the data cannot be ensured, and an account or money of any user may be endangered.

SUMMARY OF THE INVENTION

The object of the present invention is to provide a method for making data transmission, which makes the data transmission safer and more efficient.

The other object of the present invention is to provide a device for making data transmission, which makes the data transmission safer and more efficient.

Thus, according to one aspect of the present invention, there is provided a method for making data transmission, comprising:

step s1, turning on a device, waiting for receiving first data sent from an upper computer, and parsing the first data to obtain a first content hash value, a first hash value and a first length when the first data sent from the upper computer is received;

step s2, verifying, by the device, the first data according to a first public key which is stored by itself, and determining whether the first data is verified successfully, if yes, returning a verifying successful response to the upper computer, and executing step s3; otherwise, returning a verifying unsuccessful response to the upper computer, and ending the method;

step s3, waiting, by the device, for receiving data block sent from the upper computer, verifying a currently received data block according to the first hash value and the first length when the data block is received, and determining whether the data block is verified successfully, if yes, executing step s4; otherwise, returning a verifying unsuccessful response to the upper computer, and ending the method;

step s4, parsing, by the device, the current received data block to obtain valid payload data, a second length and a second hash value, decrypting the valid payload data to obtain a valid payload data plaintext, storing the valid payload data plaintext, determining whether the second length is the first preset value, if yes, executing step s5; otherwise, returning data block verified successful response to the upper computer, and replacing the first length with the second length, replacing the first hash value with the second hash value, and returning to step s3; and step s5, making, by the device, hash algorithm on the valid payload data plaintext to obtain a second content hash value, and determining whether the first content hash value equals the second content hash value, if yes, the data transmission is successful, and returning data transmission successful response to the upper computer, and ending the method; otherwise, the data transmission is unsuccessful, and returning data transmission unsuccessful response to the upper computer, and ending the method.

Preferably, step s1 specifically comprises:

turning on the device, waiting for receiving the first data, and when the first data is received, parsing the first data to obtain the first hash value, the first length, a first signature value, an initialization vector and the first content hash value.

Preferably, verifying the first data according to the first public key stored by the device itself specifically includes:

step s2-1, joining, by the device, the first hash value, the first length, the initialization vector and the first content hash value successively to obtain joint data, and making hash algorithm on the joint data to obtain a first hash operation result;

step s2-2, decrypting, by the device, the first signature value by using the first public key stored by the device itself to obtain a first decrypted value; and step s2-3, determining, by the device, whether the first hash operation result is the same as the first decrypted value, if yes, the first data is verified successfully; otherwise, the first data is verified unsuccessfully.

Preferably, verifying the currently received data according to the first hash value and the first length and determining whether the data is verified successfully in step s3 specifically comprises:

step s3-1, obtaining, by the device, a length of the currently received data block, and calculating a hash value of the currently received data block;

step s3-2, determining, by the device, whether the length of the currently received data block is the same as the first length, if yes, executing step s3-3; otherwise, the currently received data block is verified unsuccessfully; and step s3-3, determining, by the device, whether the hash value of the second data is the same as the first hash value, if yes, the second data is verified unsuccessfully; otherwise, the second data is verified unsuccessfully.

Preferably, in step s4, before storing the valid payload data, the method further includes decrypting, by the device, valid payload data ciphertext in the currently received data block to obtain the valid payload plaintext.

Preferably, after determining the second length is the first preset value, step s4 further comprises:

determining, by the device, whether the second hash value is the second preset value, if yes, data transmission is successful, returning data transmission successful response to the upper computer, and ending the method; otherwise, returning error response to the upper computer, and ending the method.

According to another aspect of the present invention, there is provided a device for making data transmission, comprising:

a receiving module which is configured to receive the first data sent from the upper computer after the device is turned on;

a parsing module which is configured to parse the first data to obtain the first content hash value, the first hash value and the first length when the receiving module receives the first data;

a verifying signature module which is configured to verify signature on the first data received by the receiving module by using the first public key stored by the device, and determine whether the first data is verified successfully, and to trigger a returning module;

the returning module which is configured to return a verifying successful response to the upper computer when the verifying module determines that the first data is verified successfully; and is further configured to return a verifying unsuccessful response to the upper computer when the verifying module determines that the first data is verified unsuccessfully;

the receiving module is further configured to receive data block sent from the upper computer;

a verifying module which is configured to verify the currently received data block according to the first hash value and the first length obtained by the parsing module when the receiving module receives the data block sent from the upper computer, and determine whether the data block is verified successfully, if yes, to trigger a paring module; otherwise, to trigger a returning module;

the parsing module is further configured to parse the currently received data block to obtain the valid payload data, the second length and the second hash value when the receiving module receives the data block;

a decrypting module which is configured to decrypt the valid payload data obtained by the parsing module to obtain the valid payload data plaintext;

a storing module which is configured to store the valid payload data plaintext obtained by the decrypting module;

a determining module which is configured to determine whether the second length is the first preset value, if yes, to trigger a hash module; otherwise, to trigger the returning module and a replacing module;

the replacing module which is configured to replace the first length with the second length and replace the first hash value with the second hash value when the determining module determines that the second length is not the first preset value, and to trigger the receiving module;

a hash module which is configured to operate hash algorithm on the valid payload data plaintext to obtain the second content hash value when the determining module determines that the second length is the preset value; and the determining module is further configured to determine whether the first content hash value equals the second content hash value after the hash module obtains the second content hash value.

Preferably, the paring module is specifically configured to parse the first data to obtain the first hash value, the first length, the first signature value, the initialization vector and the first content hash value when the receiving module receives the first data.

Preferably, the verifying signature module includes:

a jointing sub-module which is configured to join the first hash value, the first length, the initialization vector and the first content hash value, so as to obtain the joint data;

a hash sub-module which is configured to operate hash algorithm on the joint data obtained by the joining sub-module to obtain the first hash operation result;

a decrypting sub-module which is configured to decrypt the first signature value by using the first public key stored by itself to obtain the first decrypted value;

a first determining sub-module which is configured to determine whether the first hash operation result is the same as the first decrypted value.

Preferably, the verifying module includes:

an obtaining sub-module which is configured to obtain the length of the currently received data block;

a second determining sub-module which is configured to determine whether the length of the currently received data block obtained by the obtaining sub-module is the same as the first length;

a calculating sub-module which is configured to calculate a hash value of the currently received data block;

the second determining sub-module is further configured to determine whether the hash value of the currently received data block is the same as the first hash value.

Preferably, the determining module is further configured to determine the second hash value is the second preset value after the determining module determines that the second length is the first preset value.

According to the present invention, the data transmission is safer and more efficient.

PREFERRED EMBODIMENTS TO CARRY OUT THE INVENTION

The technical solution in the embodiments of the present invention is further described more clearly and completely together with the drawings of the present invention. Apparently, the embodiments described herein are just a few Embodiments of the present invention. On the basis of the embodiments of the invention, all other related embodiments made by those skilled in the art without any inventive work belong to the scope of the invention.

Embodiment 1

Figure 1:
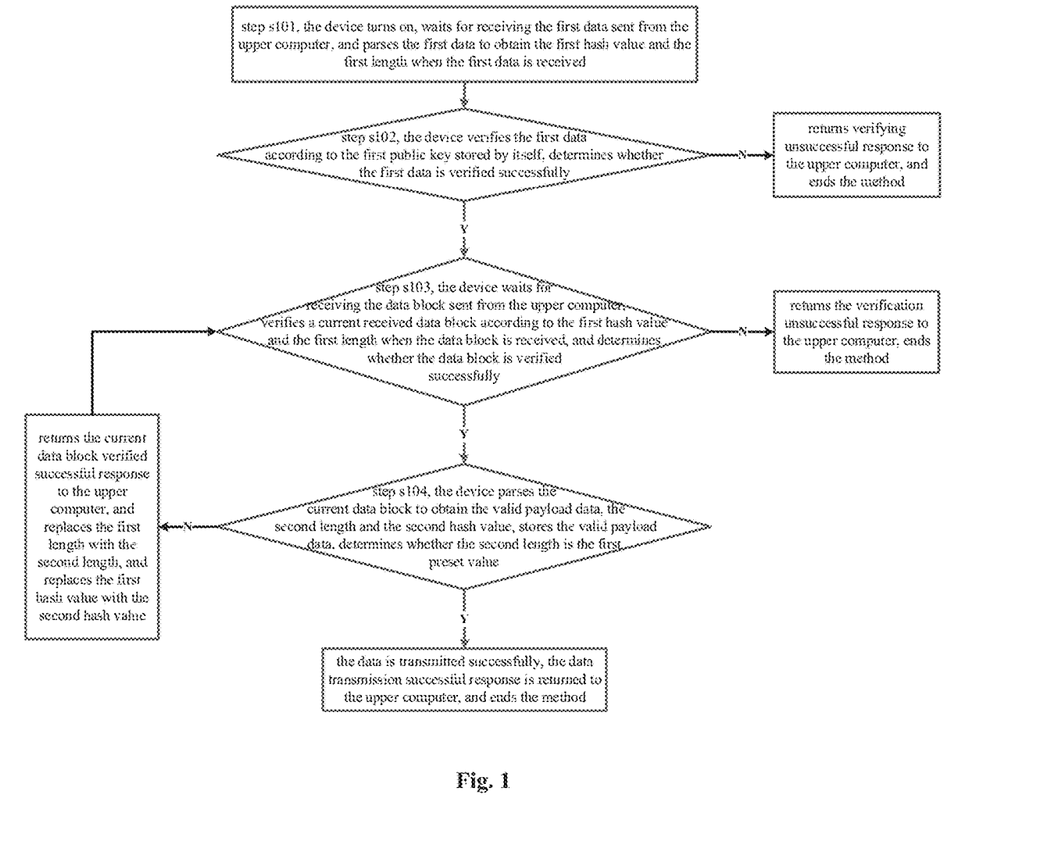
FIG. 1 is a flow diagram of a method for making data transmission according to Embodiment 1 of the present invention.

According to Embodiment 1, it provides a method for making data transmission, as shown in FIG. 1, the method comprises the following steps.

Step s101, a device turns on, waits for receiving the first data sent from an upper computer, and parses the first data to obtain the first hash value and the first length when the first data is received.

Preferably, step s101 specifically is that after the device is turned on, the device waits for receiving a data head sent from the upper computer, parses the received data head to obtain a first hash value, a first length, a first signature value, an initialization vector (ICV), and a first content hash value when the data head is received.

Preferably, the first hash value is a hash value of the next data block of the data which is need transmitted; the first length is a length of the next data block in the data which needs to be transmitted; the first signature value is the signature value which is obtained by the upper computer using the private key to sign on all the data which is after the first signature value stored in the data head; the first content hash value is the hash value which is obtained by the upper computer operating hash algorithm on the valid payload data which needs to be transmitted to the device.

Preferably, the data head includes the first signature value, the first hash value, the first length, ICV and the first content hash value.

Step s102, the device verifies the first data according to the first public key stored by itself, determines whether the first data is verified successfully, if yes, executes step s103; otherwise, returns verifying unsuccessful response to the upper computer, and ends the method.

Preferably, in step s102, device verifying the first data according to the first public key stored by the device itself specifically includes:

step s102-1, the device joins the first hash value, the first length ICV and the first content hash value successively to obtain joint data, and operates hash algorithm on the joint data to obtain the first hash operation result;

specifically, the device joins the hash value of the next data block which is A5 3A 74 A9 F0 F7 A0 49 41 86 E7 6F 02 9DD8 45 6F 3E 98 5F 7F FA E2 78 88 32 CB A3 6B 2A 3F 91, the length of the next data block which is 00 E2, ICV which is 6E 49 48 9F 0A FE D7 0A 50 60 32 1C DC D58B BE, and the first content hash value which is E9 76 D4 2B 76 EE 99 24 A0 19 A4 8F FC E7F7 DF 23 8C 17A0 0F E7 1C F4 8F 6F B2 6F 8B 0A 7C 17 to obtain the joint data, and operates hash algorithm on the joint data to obtain the first hash operation result which is E4FF5E7D7A7F08E9800A3E25CB774533CB 20040DF3086BA10F956 F9ACD0EB3F7;

step s102-2, the device decrypts the first signature value by using RSA public key which is stored by itself to obtain a first decrypted value;

specifically, the device decrypts the first signature value which is C0 49 34 46 8B B9 66 16 B4 32 CA E8 06 5E 6C 46 FD 38 A0 F0 99 66 5D FF 11 77 40 99 03 E5 5E A8 03 1C 60 3E DD 3F DA 7A F2 CC D3 0C F2 C6 C6 D2 9E 59 03 56 43 B3 5A 28 F6 52 A3 1C 07 B9 11 D8 63 CB 1B 29 6F 13 8C 09 12 90 4C E5 2 8 87 BD 1F 06 68 BE BD 3B AB DD 10 17 07 BA 80 BD 36 8A 2B E8 B2 15 02 11 31 0F 5E 7D 59 7B FC 57 E1 28 7A 8C 50 51 A4 ED 9D 8C 8D F8 B4 15 C6 D0 BB 96 64 E1 D6 F7 3E 54 4E 38 D4 9D 77 61 10 B5 88 5E A4 3C 1B E2 DD EB 5F 43 4C C0 2A 4E DB 4C B3 B6 E8 15 EE A7 82 7B 82 94 1F F2 51 CE B5 81 70 0D F7 93 03 76 1C 84 5F B0 28 8E 64 42 60 84 4B B0 00 1F F6 63 DF 39 01 66 1C 04 F1 AD 45 07 1D 0C A3 84 0F E7 E1 89 FD 26 9D 44 11 B1 0B 54 14 B7 82 44 D9 ED 68 09 75 B0 73 DD 59 43 42 43 9F 6E F0 3B AA 80 CF 80 90 58 13 5F FA 90 6C 0D 44 9B 25 87 93 F7 89 DF 8B FC 52 B0 DF CA C6 A0 FE B1 20 CF 7D 0C DD EE 9E CA B5 53 38 0D 78 DF 7A 35 97 76 A2 0B 93 7B 80 6F 25 1A 5A CF 6F BA 69 9C 43 9D 63 00 30 D9 FE C2 D8 CB 61 08 55 85 51 EF 21 AE C6 C6 F8 28 68 85 B8 22 34 B7 6C 65 71 C3 A1 B7 61 39 05 FA 2F D5 90 E2 B0 1C EF 74 E8 CF 6E 63 BC 70 D3 60 24 49 F5 4E F8 89 72 18 76 A2 27 52 97 22 88 C2 F8 71 E9 E1 C7 B9 FF 01 CA 84 8E by using RSA public key which is 0xc8, 0xef, 0x98, 0xfe, 0x7e, 0xc2, 0x69, 0x79, 0x59, 0xa3, 0x6c, 0x1c, 0x13, 0x9b, 0xf6, 0x0b, 0x55, 0x2f, 0xcd, 0xbb, 0xf2, 0x57, 0x7c, 0x67, 0xef, 0x3d, 0xaa, 0xee, 0x60, 0xa8, 0x3a, 0x1d, 0x9c, 0xba, 0x16, 0xb7, 0xc6, 0xe1, 0x80, 0x5c, 0xe1, 0x44, 0xcd, 0xc3, 0xf4, 0x4d, 0x67, 0xb4, 0x32, 0x90, 0xb4, 0x8b, 0x45, 0x67, 0xa7, 0x3b, 0x18, 0xc, 0x5 8, 0x99, 0x66, 0x33, 0xee, 0xdc, 0xcf, 0xe2, 0x9d, 0xae, 0x78, 0x8f, 0x5b, 0x91, 0x0d, 0xfa, 0xa5, 0x11, 0xb2, 0x4f, 0x79, 0xda, 0x24, 0x8d, 0x32, 0x1e, 0x32, 0x52, 0xcc, 0xc0, 0xcc, 0x1e, 0x9d, 0x27, 0xc3, 0xc0, 0xe3, 0x96, 0xc5, 0xa6, 0x56, 0x92, 0xed, 0x9f, 0xaa, 0xe2, 0x3a, 0x8b, 0xd3, 0x49, 0x52, 0xd0, 0x0d, 0x63, 0xcd, 0x93, 0xb1, 0x8b, 0x72, 0x9c, 0x63, 0x80, 0xe3, 0x71, 0x94, 0x04, 0x0c, 0x1c, 0xb0, 0x7d, 0xf5, 0x0b, 0x07, 0x84, 0x60, 0xd3, 0xdf, 0xf1, 0xdb, 0x5f, 0xd0, 0x0f, 0x4a, 0x02, 0x60, 0xf6, 0xf7, 0x72, 0xe6, 0xf4, 0x60, 0x2b, 0x04, 0xcd, 0x95, 0x65, 0xce, 0xbc, 0x5b, 0xf2, 0x7 3, 0x8e, 0xcb, 0x29, 0x47, 0x92, 0xf7, 0x8c, 0x77, 0x8c, 0x93, 0x30, 0x15, 0xca, 0xc3, 0x1f, 0xe3, 0x02, 0x47, 0x66, 0x46, 0x7a, 0xb6, 0x5b, 0x01, 0x53, 0xb8, 0x23, 0xaf, 0x99, 0x3c, 0x5c, 0x1b, 0x0d, 0x78, 0x46, 0x6a, 0xdb, 0x67, 0x2c, 0xd0, 0x6d, 0x69, 0x9f, 0x5a, 0x00, 0xea, 0x30, 0x98, 0xf1, 0xa7, 0xeb, 0x1a, 0xfd, 0x0c, 0x3a, 0xa8, 0xd1, 0xc, 0x90, 0xf9, 0x19, 0x97, 0x8b, 0xa4, 0x00, 0x33, 0x4d, 0xd2, 0x31, 0x84, 0x55, 0x1d, 0x08, 0x4f, 0x4a, 0x4d, 0xda, 0xf9, 0xa4, 0x8d, 0x97, 0x02, 0x 65, 0x8c, 0xe5, 0x69, 0x6c, 0x17, 0xb3, 0xe8, 0x25, 0xf0, 0x44, 0xf4, 0xbe, 0x5a, 0xcb, 0xba, 0x53, 0xff, 0xd2, 0x2b, 0xdc, 0xd6, 0xeb, 0x4b, 0x10, 0xf6, 0x0d, 0x30, 0x13, 0xb7, 0xa2, 0x0d, 0xc6, 0x9 3, 0x58, 0x04, 0x5c, 0xd9, 0xa3, 0xc2, 0x38, 0x65, 0x14, 0x93, 0xb9, 0x95, 0xe9, 0x2d, 0xe9, 0x03, 0x58, 0xb0, 0x50, 0x91, 0x6f, 0xbf, 0xc0, 0xa2, 0x3e, 0x9f, 0xf5, 0xe8, 0x1b, 0xf4, 0x31, 0x99, 0x3d, 0xc0, 0x86, 0x98, 0x15, 0x6c, 0xe1, 0x6f, 0x99, 0x16, 0xb6, 0x4c, 0x54, 0x4b, 0xf0, 0xd9, 0xed, 0xc 7, 0xc7, 0x77, 0x50, 0xf3, 0x22, 0xf0, 0x33, 0xec, 0x39, 0x90, 0x93, 0xf0, 0x75, 0x9a, 0xec, 0x7f, 0x0 a, 0xb7, 0x13, 0xe2, 0xca, 0x27, 0x64, 0x45, 0xae, 0x67, 0xb5, 0xc5, 0xdd, 0xb3, 0xc1, 0xc0, 0x1a, 0x1c, 0xe0, 0xf7, 0x9d, 0x66, 0x55, 0x7e, 0x9b, 0x01, 0x3b, 0x69, 0x33, 0xea, 0x4a, 0xed, 0x36, 0x 56, 0x16, 0x9c, 0x88, 0x20, 0x11, 0x62, 0xbb, 0xf5, 0x81 to obtain the first decrypted value;

step s102-3, the device determines whether the first hash operation result is the same as the first decrypted value, if yes, the first data is verified successfully; otherwise, the first data is verified unsuccessfully.

Step s103, the device waits for receiving the data block sent from the upper computer, verifies a currently received data block according to the first hash value and the first length when the data block is received, and determines whether the data block is verified unsuccessfully, if yes, executes step s104; otherwise, returns the verification unsuccessful response to the upper computer, then ends the method.

Preferably, verifying the currently received data block according to the first hash value and the first length, and determining whether the currently received block is verified successfully specifically includes:

step s103-1, the device obtains the length of the currently received data block, and calculates the hash value of the currently received data block;

step s103-2, the device determines whether the length of the currently received data block is the same as the first length, if yes, executes step s103-3; otherwise, the currently received data block is verified unsuccessfully; and step s103-3, the device determines whether the hash value of the currently received data block is the same as the first hash value, if yes, the currently received data block is verified successfully; otherwise, the currently received data block is verified unsuccessfully.

Preferably, when the device receives the current data block, the valid payload data in the current data block can be encrypted; when the valid payload data is the encrypted data and the currently received data block is verified successfully, and before step s104, step s103 further includes that decrypting the valid payload data in the current data block to obtain the valid payload data plaintext.

Step s104, the device parses the current data block to obtain the valid payload data, the second length and the second hash value, stores the valid payload data, determines whether the second length is the first preset value, if yes, the data transmission is successfully, the data transmission successful response is returned to the upper computer, and ends the method; otherwise, returns the current data block verified successful response to the upper computer, and replaces the first length with the second length, and replaces the first hash value with the second hash value, and returns to step s103.

Preferably, when determining that the second length is the first preset value, step s104 further includes that the device determines whether the second hash value is the second preset value, if yes, the data transmission is successful, the data transmission successful response to the upper computer, and the method is ended; otherwise, returns error response to the upper computer, and ends the method.

Preferably, when determining that the second length is the first preset value, the second hash value is the second preset value, step s104 further includes:

the device operates hash algorithm on the received valid payload data to obtain the second content hash value, and determines whether the second content hash value is the first content hash value, if yes, the data transmission is successful, the data transmission successful response is returned to the upper computer, and the method is ended; otherwise, the data transmission is unsuccessful, and the data transmission unsuccessful response is returned to the upper computer, then the method is ended.

Embodiment 2

Figure 2:
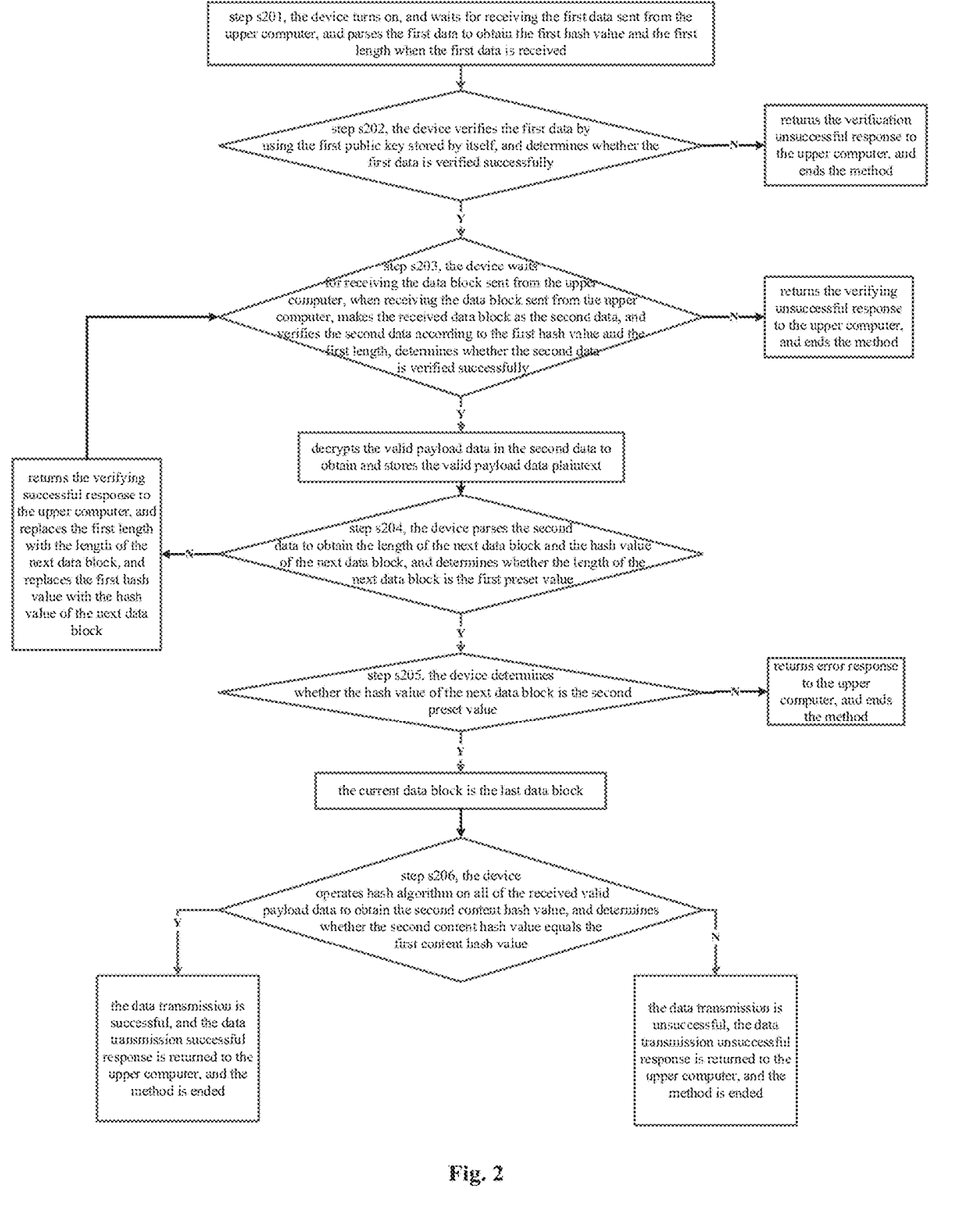
FIG. 2 is a flow diagram of a method for making data transmission according to Embodiment 2 of the present invention.

According to Embodiment 2, it provides a method for making data transmission, as shown in FIG. 2, including the following steps.

Step s201, a device turns on, and waits for receiving the first data sent from an upper computer, and parses the first data to obtain the first hash value and the first length when the first data is received.

Preferably, step s201 specifically is that the device turns on, waits for receiving the data head sent from the upper computer, and parses the data head to obtain the first signature value, to obtain the hash value of the next data block as the first hash value, to obtain the length of the next data block as the first length, and to obtain the ICV and the first content hash value (Content Hash) when the data head is received, in which the first signature value is the signature value which is obtained by that the upper computer signs on all of the data which is after the first signature value stored in the data head by using the private key; the first content hash value is the hash value which is obtained by the upper computer operating hash algorithm on the data which needs to be transmitted to the device.

For instance, the data head received by the device is C0 49 34 46 8B 89 66 16 B4 32 CA E8 06 5E 6C 46 FD 38 A0 F0 99 66 5D FF 11 77 40 99 03 E5 5E A8 03 1C 60 3E DD 3F DA 7A F2 CC D3 0C F2 C6 C6 D2 9E 59 03 56 43 83 5A 28 F6 52 A3 1C 07 89 11 D8 63 CB 1B 29 6F 13 8C 09 12 90 4C E5 28 87 BD 1F 06 68 BE BD 3B AB DD 10 17 07 BA 80 BD 36 8A 2B E8 B2 15 02 11 31 0F 5E 7D 59 7B FC 57 E1 28 7A 8C 50 51 A4 ED 9D 8C 8D F8 B4 15 C6 D0 BB 96 64 E1 D6 F7 3E 54 4E 38 D4 9D 77 61 10 B5 88 5E A4 3C 1B E2 DD EB 5F 4 34 C0 2A 4E DB 4C B3 B6 E8 15 EE A7 82 7B 82 94 1F F2 51 CE B5 81 70 0D F7 93 03 76 1C 84 5F B0 28 8E 64 42 60 84 4B B0 00 1F F6 63 DF 39 01 66 1C 04 F1 AD 45 07 1D 0C A3 84 0F E7 E1 89 FD 26 9D 44 11 B1 0B 54 14 B7 82 44 D9 ED 68 09 75 B0 73 DD 59 43 42 43 9F 6E F0 38 AA 80 CF 80 90 58 13 5F FA 90 6C 0D 44 9B 25 87 93 F7 89 DF 8B FC 52 80 DF CA C6 A0 FE B1 20 CF 7D 0C DD EE 9E CA B5 53 38 0D 78 DF 7A 35 97 76 A2 0B 93 7B 80 6F 25 1A 5A CF 6F BA 69 9C 43 9D 63 00 30 D9 FE C2 D8 CB 61 08 55 85 51 EF 21 AE C6 C6 F8 28 68 85 B8 22 34 B7 6C 65 71 C3 A1 B7 61 39 05 FA 2F D5 90 E2 B0 1C EF 74 E8 CF 6E 63 BC 70 D3 60 24 49 F5 4E F8 89 72 18 76 A2 27 52 97 22 88 C2 F8 71 E9 E1 C7 B9 FF 01 CA 84 8E A5 3A 74 A9 F0 F7 A0 49 41 86 E7 6F 02 9D D8 45 6F 3E 98 5F 7F FA E2 78 88 32 CB A3 6B 2A 3F 91 00 E26E 49 48 9F 0A FE D7 0A 50 60 32 1C DC D5 8B BE E9 76 D4 2B 76 EE 99 24 A0 19 A4 8F FC E7 F7 DF 23 8C 17 A0 0F E7 1C F4 8F 6F B2 6F 8B 0A 7C 17;

the first signature value obtained by parsing the data head is C0 49 34 46 8B B9 66 16 B4 32 CA E8 06 5E 6C 46 FD 38 A0 F0 99 66 5D FF 11 77 40 99 03 E5 5E A8 03 1C 60 3E DD 3F DA 7A F2 CC D3 0C F2 C6 C6 D2 9E 59 03 56 43 83 5A 28 F6 52 A3 1C 07 B9 11 D8 63 CB 1B 29 6F 13 8C 09 12 90 4C E5 28 87 BD 1F 06 68 BE BD 3B AB DD 10 17 07 BA 80 BD 36 8A 2B E8 82 15 02 11 31 0F 5E 7D 59 7B FC 57 E1 28 7A 8C 50 51 A4 ED 9D 8C 8D F8 B4 15 C6 D0 BB 96 64 E1 D6 F7 3E 54 4E 38 D4 9D 77 61 10 B5 88 5E A4 3C 1B E2 DD EB 5F 43 4C C0 2A 4E DB 4C B3 86 E8 15 EE A7 82 7B 82 94 1F F2 51 CE B5 81 70 0D F7 93 03 76 1C 84 5F B0 28 8E 64 42 60 84 4B B0 00 1F F6 63 DF 39 01 66 1C 04 F1 AD 45 07 1D 0C A3 84 0F E7 E1 89 FD 26 9D 44 11 81 0B 54 14 B7 82 44 D9 ED 68 09 75 B0 73 DD 59 43 42 43 9F 6E F0 3B AA 80 CF 80 90 58 13 5F FA 90 6C 0D 44 9B 25 87 93 F7 89 DF 8B FC 52 B0 DF CA C6 A0 FE B1 20 CF 7D 0C DD EE 9E CA B5 53 38 0D 78 DF 7A 35 97 76 A2 0B 93 7B 80 6F 25 1A 5A CF 6F BA 69 9C 43 9D 63 00 30 D9 FE C2 D8 CB 61 08 55 85 51 EF 21 AE C6 C6 F8 28 68 85 B8 22 34 87 6C 65 71 C3A1 87 61 39 05 FA 2F D5 90 E2 B0 1C EF 74 E8 CF 6E 63 BC 70 D3 60 24 49 F5 4E F8 89 72 18 76 A2 27 52 97 22 88 C2 F8 71 E9 E1 C7 B9 FF 01 CA 84 8E;

the first hash value is A5 3A 74 A9 F0 F7 A0 49 41 86 E7 6F 02 9D D8 45 6F 3E 98 5F 7F FA E2 78 88 32 CB A3 68 2A 3F 91;

the first length is 00 E2;

ICV is 6E 49 48 9F 0A FE D7 0A 50 60 32 1C DC D5 88 BE;

the first content hash value is E9 76 D4 2B 76 EE 99 24 A0 19 A4 8F FC E7 F7 DF 23 8C 17 A0 0F E7 1C F4 8F 6F B2 6F 8B 0A 7C 17.

Step s202, the device verifies the first data by using the first public key stored by the device itself, and determines whether the first data is verified successfully, if yes, executes step s203; otherwise, returns the verification unsuccessful response to the upper computer, then ends the method.

Preferably, step s202 specifically is that the device operates RSA verifying signature on the first hash value, the first length, the first signature value, ICV and the first content hash value, determines whether the verifying signature result is successful, if yes, stores the data head, and executes step s203; otherwise, returns verifying signature unsuccessful response to the upper computer, then ends the method.

Step s203, the device waits for receiving the data block sent from the upper computer, when receiving the data block sent from the upper computer, makes the received data block as the second data, and verifies the second data according to the first hash value and the first length, determines whether the second data is verified successfully, if yes, decrypts the valid payload data in the second data to obtain and store the valid payload data plaintext, and executes step s204; otherwise, returns a verifying unsuccessful response to the upper computer, then ends the method.

Preferably, step s203 specifically is that the device waits for receiving the data block sent from the upper computer, makes the received data block as the current data block when receiving the data block, verifies the current data block according to the first hash value and the first length, and determines whether the current data block is verified successfully, if yes, decrypts the valid payload data in the current data block, obtains and stores the valid payload data plaintext in the current data block plaintext, and executes step s204; otherwise, returns a verifying unsuccessful response to the upper computer, then ends the method.

Preferably, verifying the current data block according to the first hash value and the first length, and determining whether the current data block is verified successfully in step s203 specifically includes:

step s203-1, the device makes the received data block as the current data block, calculates the length of the current data block, and determines whether the first length is the same as the length of the current data block, if yes, executes step s203-2; otherwise, the current data block is verified unsuccessfully; and step s203-2, the device calculates the hash value of the current data block, determines whether the hash value of the current data block equals the first hash value, if yes, the current data block is verified successfully; otherwise, the current data block is verified unsuccessfully.

Step s204, the device parses the second data to obtain the length of the next data block and the hash value of the next data block, and determines whether the length of the next data block is the first preset value, if yes, executes step s205; otherwise, returns the verifying successful response to the upper computer, and replaces the first length with the length of the next data block, and replaces the first hash value with the hash value of the next data block, then returns to step s203.

Preferably, step s204 specifically includes that the device parses the current data block to obtain the length of the next data block and the hash value of the next data block, and determines whether the length of the next data block is 0, if yes, executes step s205; otherwise, returns verifying successful response to the upper computer, and replaces the first length with the length of the next data block, and replaces the first hash value with the hash value of the next data block, then returns to step s203.

Step s205, the device determines whether the hash value of the next data block is the second preset value, if yes, the current data block is the last data block, and executes step s206; otherwise, returns an error response to the upper computer, then ends the method.

Preferably, step s205 specifically is that the device determines whether the hash value of the next data block is 0xE3, 0xB0, 0xC4, 0x42, 0x98, 0xFC, 0x1C, 0x14, 0x9A, 0xFB, 0xF4, 0xC8, 0x99, 0x6F, 0xB9, 0x24, 0x27, 0xAE, 0x41, 0xE4, 0x64, 0x9B, 0x93, 0x4C, 0xA4, 0x95, 0x99, 0x1B, 0x78, 0x52, 0xB8, 0x55, if yes, the current data block is the last data block, and executes step s206; otherwise, returns an error response to the upper computer.

Step s206, the device operates hash algorithm on all of the received valid payload data to obtain the second content hash value, and determines whether the second content hash value equals the first content hash value, if yes, the data transmission is successful, and the data transmission successful response is returned to the upper computer, and the method is ended; otherwise, the data transmission is unsuccessful, the data transmission unsuccessful response is returned to the upper computer, then the method is ended.

Embodiment 3

Figure 3:
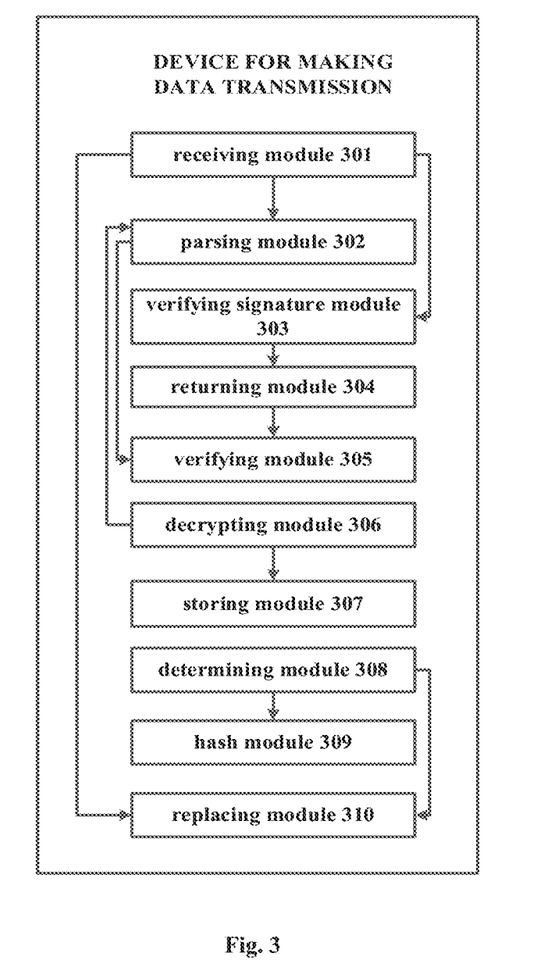
FIG. 3 is a flow diagram of a method for making data transmission according to Embodiment 3 of the present invention.

According to Embodiment 3 of the present invention, it provides a device for making data transmission, as shown in FIG. 3, the device includes:

a receiving module 301 which is configured to receive the first data sent from the upper computer after the device turns on;

a parsing module 302 which is configured to parse the first data to obtain a first content hash value, a first hash value and a first length when the receiving module 301 receives the first data;

a verifying signature module 303 which is configured to verify the first data received by the receiving module 301 according to the first public key stored by itself, and determine whether the first data is verified successfully and to trigger a returning module 304;

the returning module 304 which is configured to return the verifying signature successful response to the upper computer when the verifying signature module 303 determines that the first data is verified successfully, and to return the verifying signature unsuccessful response to the upper computer when the verifying signature module 303 determines that the first data is verified unsuccessfully;

the receiving module 301 is further configured to receive the data block sent from the upper computer;

a verifying module 305 which is configured to verify the currently received data block according to the first hash value obtained by the parsing module 302 and the first length when the receiving module 301 receives the data block sent from the upper computer, determines whether the currently received data block is verified successfully, if yes, to trigger the parsing module 302; otherwise, to trigger the returning module 304;

the parsing module 302 which is configured to parse the currently received data block to obtain the valid payload data, the second length and the second hash value when the receiving module 301 receives the data block;

a decrypting module 306 which is configured to decrypt the valid payload data obtained by the decrypting module 302 to obtain the valid payload data plaintext;

the storing module 307 which is configured to store the valid payload data plaintext obtained by the decrypting module 306;

a determining module 308 which is configured to determines whether the second length is the first preset value, if yes, to trigger a hash module 309; otherwise, to trigger the returning module 304 and the replacing module 310;

the replacing module 310 which is configured to replace the first length with the second length and replace the first hash value with the second hash value when the determining module 308 determines that the second length is not the first preset value, and to trigger the receiving module 301;

the hash module 309 is configured to operate hash algorithm on the valid payload data plaintext to obtain the second content hash value when the determining module 308 determines that the second length is the first preset value; and the determining module 308 is further configured to determine whether the first content hash value equals the second content hash value after the hash module 309 obtains the second content hash value.

Preferably, the parsing module 302 is specifically configured to parse the first data to obtain the first hash value, the first length, the first signature value, the initialization vector and the first content hash value when the receiving module 301 receives the first data.

Preferably, the verifying signature module 303 includes:

a jointing sub-module which is configured to join the first hash value, the first length, the initialization vector and the first content hash value to obtain the joint data;

a hash sub-module which is configured to operate hash algorithm on the joint data obtained by the jointing sub-module to obtain the first hash operation result;

a decrypting sub-module which is configured to decrypt the first signature value by using the first public key stored by itself to obtain the first decrypted value;

a first determining sub-module which is configured to determines whether the first hash operation result is the same as the first decrypted value.

Preferably, the verifying module 305 includes:

an obtaining sub-module which is configured to obtain the length of the currently received data block;

a second determining sub-module which is configured to determine whether the length of the currently received data block obtained by the obtaining sub-module is the same as the first length;

a calculating sub-module which is configured to calculate the hash value of the currently received data block;

the second determining sub-module which is further configured to the hash value of currently received data block is the same as the first hash value.

Preferably, the determining module 308 is further configured to determine the second hash value is the second preset value after determining that the second length if the preset value.

The invention claimed is:

1. A method for making an online data transmission, wherein said method comprises the following steps:

s1) turning on a device, waiting for, by the device, receiving a first data sent from an upper computer, and parsing the first data to obtain a first content hash value, a first hash value and a first length when the first data is received, in which the first hash value and the first length are hash value and length of a next data block in the data which needs to be transmitted;

s2) verifying, by the device, the first data according to a first public key which is stored in the device itself, and determining whether the first data is verified successfully, if yes, returning a verifying successful response to the upper computer, and executing step s3; otherwise, returning a verifying unsuccessful response to the upper computer, then stopping data transmission;

s3) waiting for, by the device, receiving data block sent from the upper computer, verifying a currently received data block according to the first hash value and the first length when the data block is received, and determining whether the data block is verified successfully, if yes, executing step s4; otherwise, returning a verifying unsuccessful response to the upper computer, then stopping data transmission;

s4) parsing, by the device, the currently received data block to obtain a valid payload data, a second length and a second hash value, in which the second hash value and the second length are a hash value and a length of the next data block in the data which needs to be transmitted, and are used to determine whether the currently received data block is the last data block which needs to be transmitted, decrypting the valid payload data to obtain a valid payload data plaintext, storing the valid payload data plaintext, determining whether the second length is a first preset value, if yes, executing step s5; otherwise, returning a data block verified successful response to the upper computer, and replacing the first length in the first data with the second length, replacing the first hash value in the first data with the second hash value, and returning to step s3; and s5) making, by the device, hash algorithm on the valid payload data plaintext to obtain a second content hash value, and determining whether the first content hash value equals the second content hash value, if yes, determining that the data transmission is successful, and returning a data transmission successful response to the upper computer, and then stopping data transmission; otherwise, determining that the data transmission is unsuccessful, and returning a data transmission unsuccessful response to the upper computer, then stopping data transmission.

2. The method as claimed in claim 1, wherein step s1 specifically comprises:

turning on the device, waiting for, by the device, receiving the first data sent from the upper computer, and parsing the first data to obtain the first hash value, the first length, a first signature value, an initialization vector, and the first content hash value when the first data is received.

3. The method as claimed in claim 2, wherein verifying, by the device, the first data according to the first public key stored in the device itself in step s2 specifically comprises:

s2-1) joining, by the device, the first hash value, the first length, the initialization vector and the first content hash value successively to obtain joint data, and making hash algorithm on the joint data to obtain a first hash operation result;

s2-2) decrypting, by the device, the first signature value by using the first public key stored in the device itself to obtain a first decrypted value; and s2-3) determining, by the device, whether the first hash operation result is the same as the first decrypted value, if yes, the first data is verified successfully; otherwise, the first data is verified unsuccessfully.

4. The method as claimed in claim 1, wherein verifying the currently received data according to the first hash value and the first length and determining whether the data is verified successfully in step s3 specifically comprises:

s3-1) obtaining, by the device, a length of the currently received data block, determining whether the length of the currently received data block is the same as the first length, if yes, executing step s3-2; otherwise, the currently received data block is verified unsuccessfully;

step s3-2) calculating, by the device, a hash value of the currently received data block, determining whether the hash value of the currently received data block is the same as the first hash value, if yes, the currently received data block is verified successfully; otherwise, the currently received data block is verified unsuccessfully.

5. The method as claimed in claim 1, wherein when determining the second length is the first preset value, step s4 further comprises: determining, by the device, whether the second hash value is a second preset value, if yes, executing step s5; otherwise, returning an error response to the upper computer, then stopping data transmission.

* * * * *